US008265875B2

(12) United States Patent
Moore

(10) Patent No.: US 8,265,875 B2
(45) Date of Patent: *Sep. 11, 2012

(54) INTERPOLATION OF PERIODIC DATA

(75) Inventor: Ian Moore, Mosman Park (AU)

(73) Assignee: WesternGeco L.L.C., Houston, TX (US)

( * ) Notice: Subject to any disclaimer, the term of this patent is extended or adjusted under 35 U.S.C. 154(b) by 293 days.

This patent is subject to a terminal disclaimer.

(21) Appl. No.: 12/696,190

(22) Filed: Jan. 29, 2010

(65) Prior Publication Data

US 2011/0191032 A1    Aug. 4, 2011

(51) Int. Cl.
*G01V 1/28* (2006.01)
(52) U.S. Cl. ............. 702/14; 702/2; 702/179; 367/73
(58) Field of Classification Search .......... 702/2, 14, 702/179; 367/73; 708/290; 703/3
See application file for complete search history.

(56) References Cited

U.S. PATENT DOCUMENTS

| | | | |
|---|---|---|---|
| 6,748,098 | B1 | 6/2004 | Rosenfeld |
| 7,076,091 | B2 | 7/2006 | Rosenfeld |
| 7,310,579 | B2 | 12/2007 | Ricard et al. |
| 2005/0114032 | A1 | 5/2005 | Wang |
| 2006/0291328 | A1 | 12/2006 | Robertsson et al. |
| 2008/0225642 | A1 * | 9/2008 | Moore et al. .......... 367/73 |
| 2010/0002541 | A1 | 1/2010 | Ozdemir et al. |

FOREIGN PATENT DOCUMENTS

| | | |
|---|---|---|
| WO | 2005062196 A2 | 7/2005 |
| WO | 2008074972 A1 | 6/2008 |
| WO | 2008152364 A1 | 12/2008 |
| WO | 2009066047 A1 | 5/2009 |

OTHER PUBLICATIONS

Chen, et al., Analysis of Error in Reconstruction of Two-Dimensional Signals from Irregularly Spaced Samples, IEEE Transactions, Feb. 1987, pp. 173-180, vol. ASSP-35, No. 2.
J.L. Chen, on Nonuniform Sampling of Bandwidth-Limited Signals, IRE Transactions of Circuit Theory, pp. 251-257.
International Search Report of PCT Application No. PCT/US2011/022557 dated Aug. 29, 2011.
International Search Report of PCT Application No. PCT/US2008/057008 dated Apr. 20, 2009.

(Continued)

*Primary Examiner* — Sujoy Kundu

(57) ABSTRACT

A method for interpolating data. The method includes receiving data acquired at one or more locations where the data represents subterranean formations in the earth. The method also includes selecting one or more of the locations such that the selected locations are within a vicinity of an interpolation location. Next, the method includes forming a matrix of interpolation coefficients based on a first function having one or more interpolation variables, a bandwidth for an interpolation operator and one or more differences between the selected locations, wherein at least one of the interpolation variables is periodic. The method then includes forming a differences vector based on a second function having the interpolation variables, the bandwidth and one or more differences between the selected locations and the interpolation location. Using the matrix of interpolation coefficients and the differences vector, the method then forms an interpolation operator vector by applying an inverse of the matrix of interpolation coefficients to the differences vector. The method then estimates a data value for the interpolation location using the interpolation operator vector.

20 Claims, 7 Drawing Sheets

OTHER PUBLICATIONS

Fahmy et al., "Image reconstruction using shift-variant resampling kernel for magnetic resonance imaging," Proceedings of SPIE Medical Imaging, 2002, vol. 4684: pp. 825-833.

Rosenfeld, "New Approach to Gridding Using Regularization and Estimation Theory," Magnetic Resonance in Medicine, 2002, vol. 48: pp. 193-202.

Hindriks et al., "Reconstruction of 3-D seismic signals irregularly sampled along two spatial coordinates," Geophysics, Jan.-Feb. 2000, vol. 65(1): pp. 253-263.

Hale, "Resampling Irregularly Sampled Data," SEP Report, 1980: pp. 39-57.

Camargo et al., "Uniform Resampling Using the Sinc Function," Annual WIT report, 2005: pp. 15-22.

* cited by examiner

INTERPOLATION OF PERIODIC DATA

BACKGROUND

1. Field of the Invention

Implementations of various techniques described herein generally relate to data processing. More specifically, various techniques described herein generally relate to seismic data processing.

2. Description of the Related Art

The following descriptions and examples do not constitute an admission as prior art by virtue of their inclusion within this section.

In a typical seismic survey, a plurality of seismic sources, such as explosives, vibrators, airguns or the like, may be sequentially activated at or near the surface of the earth to generate energy which may propagate into and through the earth. The seismic waves may be reflected back by geological formations within the earth. The resultant seismic wave field may be sampled by a plurality of seismic sensors, such as geophones, hydrophones and the like. Each sensor may be configured to acquire seismic data at the sensor's location, normally in the form of a seismogram representing the value of some characteristic of the seismic wave field against time. The acquired seismograms or seismic data may be transmitted wirelessly or over electrical or optical cables to a recorder system. The recorder system may then store, analyze, and/or transmit the seismograms. This data may be used to detect the possible presence of hydrocarbons, changes in the subsurface and the like.

In some circumstances, sampled data (e.g., the seismic data described above) may be acquired at irregular locations. That is, data may be acquired from locations which were not planned to be sampled. For example, seismic data may be planned to be sampled in a first location. However, an obstacle (e.g., a building) may be located on top of the first location. Consequently, a sensor or receiver may not be placed at the planned first location. Therefore, the sensor may have to be placed in a second location which is close to the first location, but is not the same as the planned location. This second location may be referred to as an irregular location. Many receivers may acquire seismic data at irregular locations, resulting in irregularly spaced data.

After acquiring sampled data, the data may be processed using specific signal-processing algorithms. For example, Fourier transforms may be applied to the data. The signal-processing algorithms (e.g., Fourier transforms) may require the data to be located at regularly spaced locations. For example, the algorithms may require the data to be located at the nodes of a regularly spaced grid (e.g., a Polar coordinate system). If the data is not located at regularly spaced locations, the results of the signal-processing algorithms may be inaccurate or distorted. Consequently, using irregularly sampled data may result in inaccurate or distorted results.

One solution to the problem of having data at irregularly spaced locations while the data is needed at regularly spaced locations is to use the data at the irregularly spaced locations to estimate the data at regularly spaced locations. Obtaining data at regular locations from data which was measured at irregular locations is commonly referred to as re-sampling or interpolation. The process of interpolating data or re-sampling data onto a regular grid from data sampled at irregular locations is called regularization or gridding. Regularization of seismic data is often a very important pre-processing step for several data processing algorithms, including 3-dimensional SRME, migration and 4-dimensional survey matching.

Although the aforementioned interpolation techniques allowed for estimation of data from irregularly spaced samples, the accuracy of interpolated data from the aforementioned techniques may still be improved and the interpolated data may also suffer from the effects of noise.

SUMMARY

Described herein are implementations of various technologies for performing a full-waveform inversion in the travel-time domain. In one implementation, a method for estimating seismic data at desired locations using data acquired at locations different from the desired locations may first include receiving data acquired from the desired locations where the data represents subterranean formations in the earth. The method may then include selecting one or more of the locations such that the selected locations are within a vicinity of an interpolation location. Next, the method may include forming a matrix of interpolation coefficients based on a first function having one or more interpolation variables, a bandwidth for an interpolation operator and one or more differences between the selected locations, wherein at least one of the interpolation variables is periodic. The method may then include forming a differences vector based on a second function having the interpolation variables, the bandwidth and one or more differences between the selected locations and the interpolation location. Using the matrix of interpolation coefficients and the differences vector, the method may then form an interpolation operator vector by applying an inverse of the matrix of interpolation coefficients to the differences vector. The method may then estimate a data value for the interpolation location using the interpolation operator vector.

In another implementation, the method may include receiving seismic data acquired at one or more locations, wherein the seismic data represents subterranean formations in the earth. The method may also include selecting one or more of the locations such that the selected locations are within a vicinity of an interpolation location, selecting a bandwidth for an interpolation operator and forming a matrix of interpolation coefficients based on a first function having one or more interpolation variables, the bandwidth and one or more differences between the selected locations, wherein at least one of the interpolation variables is periodic. After forming the matrix of interpolation coefficients, the method may include forming a differences vector based on a second function having the interpolation variables, the bandwidth and one or more differences between the selected locations and the interpolation location. Using the matrix of interpolation coefficients and the differences vector, the method may then include forming an interpolation operator vector by applying the inverse of the matrix of interpolation coefficients to the differences vector. Next, the method may compute a mean square error for the interpolation operator vector, compare the mean square error for the interpolation operator vector with a predetermined acceptable mean square error and estimate a seismic data value for the interpolation location using the interpolation operator vector if the mean square error for the interpolation operator vector is less than or equal to the predetermined acceptable mean square error.

In yet another implementation, a computer system may include a memory having program instructions to receive data acquired at one or more locations, wherein the data represents subterranean formations in the earth. The program instructions may then select one or more of the locations, wherein the selected locations are within a vicinity of an interpolation location, select a bandwidth for an interpolation operator and form a matrix of interpolation coefficients based on a first function having on one or more interpolation variables, the bandwidth and one or more differences between the selected locations, wherein at least one of the interpolation variables is periodic. The program instructions may then form a differences vector based on a second function having the interpolation variables, the bandwidth and one or more differences between the selected locations and the interpolation location, form an interpolation operator vector by applying an inverse of the matrix of interpolation coefficients to the differences vector and estimate a data value for the interpolation location using the interpolation operator vector.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

Implementations of various techniques will hereafter be described with reference to the accompanying drawings. It should be understood, however, that the accompanying drawings illustrate only the various implementations described herein and are not meant to limit the scope of various techniques described herein.

DETAILED DESCRIPTION

Figure 1:
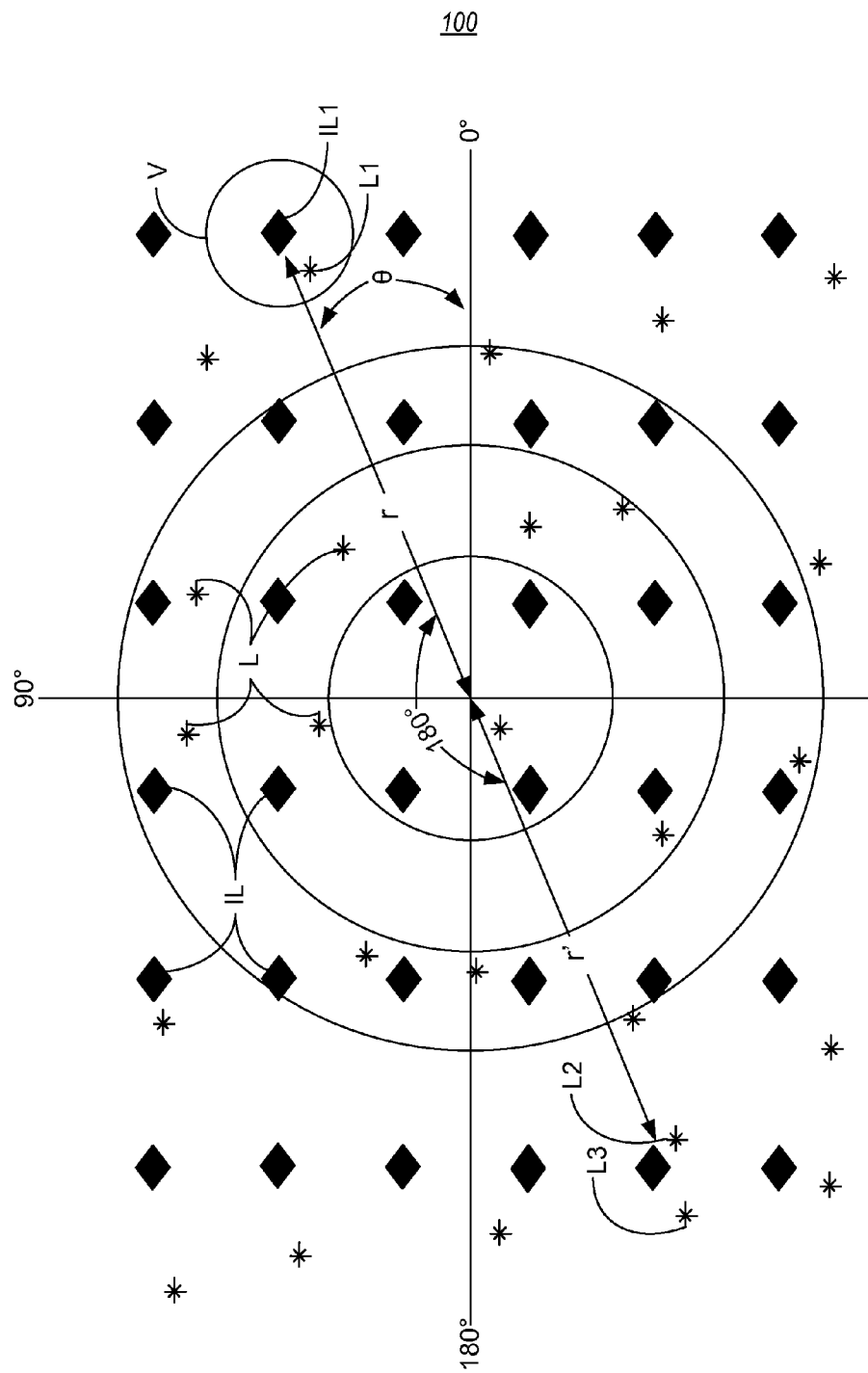
FIGS. 1 and 4 illustrate spatial sampling regimes in accordance with implementations of various techniques described herein.

The discussion below is directed to certain specific implementations. It is to be understood that the discussion below is only for the purpose of enabling a person with ordinary skill in the art to make and use any subject matter defined now or later by the patent "claims" found in any issued patent herein.

K. Hendriks and A. J. W. Duijndam proposed the use of least-squares estimation of the Fourier components for data construction in "Reconstruction of 3-D Seismic Signals Irregularly Sampled Along Two Spatial Coordinates," Geophysics 56, (2000) pp. 253-263. Their proposal consisted of a transformation of the actual data into the wave number domain, and correcting there for distortions due to the irregular sampling. The reconstruction of the data in the space domain is then achieved by an inverse Fourier transform onto a Cartesian spatial sampling grid.

Furthermore, D. Rosenfeld proposed the rBURS (Block Uniform Re-Sampling) enhanced gridding technique used to interpolate data onto a regularly spaced grid from irregularly spaced samples. (See Rosenfeld, "New Approach to Gridding Using Regularization and Estimation Theory, Magnetic Resonance in Medicine," 48, pp. 193-202, 2002). Rosenfeld's proposal introduced a regularization parameter during the gridding algorithm.

Although the aforementioned interpolation techniques allowed for estimation of data from irregularly spaced samples, the accuracy of interpolated data from the aforementioned techniques may still be improved and the interpolated data acquired using the aforementioned techniques also suffers from the effects of noise. Consequently, implementations of the present disclosure provide enhanced interpolation techniques.

In order to interpolate data from irregularly spaced data samples, interpolation operators are used to estimate data at a desired location. Interpolation operators, such as Compact Fourier Interpolation (COMFI) operators, are designed to minimize an average (rms) interpolation error for a set (space) of basis functions. Basis functions are simple functions which can be weighted and summed (i.e., linearly combined) to form more complicated functions. Typically, this space contains band-limited sinusoids of the form:

$$d(x) = e^{i(kx+\phi)}$$

and the minimization is performed over the intervals $0 < \phi < 2\pi$ and $-K < k < K$. A linear system of equations may be created for the interpolation operator in which the corresponding system matrix involves sinc functions. The sinc functions are derived from the integral $$\frac{1}{2K}\int_{-K}^{K} e^{ikx} dk = \frac{\sin(Kx)}{Kx} \stackrel{def}{=} \text{sinc}(Kx)$$

where x is the distance between two locations. In principal, any set of basis functions may be used to design the interpolation operators, provided the corresponding integrals can be evaluated.

Periodic Functions

In one implementation, the data being interpolated may be a periodic function of the distance between two locations x, i.e., $$d(x) = d(x+X)$$

where the period X is assumed known. A common example is interpolation over azimuth, for which the period $X \in \{\pi, 2\pi, 180°, 360°\}$, depending on whether reciprocity is assumed, and whether x is in radians or degrees.

If the data being interpolated is a periodic function of the distance between two locations x with sinusoidal basis functions, then only discrete wavenumbers, given by $$k_n = \frac{2\pi n}{X} = n\Delta k$$

may be used for interpolation. As such, rather than integrating over k, the sum over $\{k_n: -K < k_n < K\}$ may be determined by:

$$\frac{1}{2K}\sum_{-m}^{m} e^{ik_n x}\Delta k = \frac{\pi}{KX}\frac{\sin(Kx)}{\sin(\pi x/X)}$$

where K=(m+½)Δk, so that the normalization is appropriate for the number of terms in the series. As x/X→0 (i.e., when the period is much greater than the distances between locations), the rhs becomes equal to the sinc functions. However, if a multiple of the period X is added to the distance between two locations x, the rhs is unchanged because locations that differ by multiples of the period X are considered to be equivalent. A method for interpolating data for this type of periodic function is illustrated with reference to method 200 and FIG. 2 below.

Periodicity & Band-Width in Seismic Data

The previously described interpolation operators are appropriate for periodic, band-limited functions. In one implementation, seismic data are band-limited periodic functions of azimuth such that an appropriate maximum wavenumber may be determined for the interpolation operator.

For example, a simple model for the variation of seismic data with azimuth may be represented by a wavelet with constant shape whose amplitude and travel-time vary as periodic functions of azimuth. In the frequency domain, the wavelet may be expressed as:

$$d(x)=w(\omega)A(x)e^{i\omega t(x)}$$

where $w(\omega)$ is the underlying wavelet, and $A(x)$ and $t(x)$ represent the variations of amplitude and time with azimuth, x. $t(x)$ may be defined as:

$$t(x)=t_0+Tt'(x)$$

where $t_0$ is the average event time, T represents the magnitude of the variation of event time with azimuth, and $t'(x)$ is the normalized variation of event time with azimuth. As such, the wavelet may then be defined as:

$$d(x)=w(\omega)A(x)e^{i\omega t_0}e^{i\omega Tt'(x)}.$$

If $\omega T \ll 1$, i.e. the timing variation is small compared to the wavelength, then $$d(x)\approx w(\omega)A(x)e^{i\omega t_0}(1+i\omega Tt'(x))$$

and the maximum wavenumber in $d(x)$ is equal to the maximum wavenumber in either $A(x)$ or the product $A(x)t'(x)$. Typically, it is assumed that $A(x) \propto \cos(2\pi x/X)$, where the period X is a half-cycle. If the travel-time variation with azimuth can be approximated by a similar function, then the product has maximum wavenumber $k_2=4\pi/X$, which is twice the fundamental wavenumber, $k_1=\Delta k=2\pi/X$.

If the seismic data contain frequencies for which the timing variation is not small when compared to the period X, then the above approximation for the maximum wavenumber may not be made. In general, the seismic data can be written as a sum of periodic spectral components $$d(x)=\Sigma_{n=0}^{\infty}D_n e^{ik_n x}.$$

Here, the coefficients, $D_n$, will not be zero for any wavenumber, $k_n$. Therefore, a high wavenumber may be used for the interpolation such that the wavenumber is supported by the sampling in azimuth.

The following paragraphs provide a brief description of one or more implementations of various technologies and techniques directed at estimating data at an interpolation location using actual data having a known period in a proximity or vicinity of the interpolation location. In one implementation, the interpolation location may be defined by both the source and receiver coordinates. For example, the interpolation location may include the midpoint coordinate or the half-way point between the source and the receiver, the offset, i.e., the distance between the source and the receiver, and the source-receiver azimuth.

One aspect of the implementations described herein concerns interpolation or estimation of data using an interpolation operator. In particular, when one or more of the variables that are being interpolated are periodic and the period is known, an optimum interpolation operator may be designed based on the periodic interpolation variables. In one implementation, a system computer may estimate the seismic data using the interpolation operator. Here, the system computer may first define a grid to indicate where seismic receivers may be installed. The system computer may then select a location on the grid where a user may desire to interpolate data using the data acquired from the seismic receivers. In one implementation, the system computer may then identify the seismic receivers that are in the vicinity of the interpolation location. The data acquired from the seismic receivers in the vicinity of the interpolation location may be used to estimate the data at the interpolation location.

The seismic receivers in the vicinity of the interpolation location may include the seismic receivers that are a predetermined distance away from the interpolation location. In one implementation, the seismic receivers in the vicinity may also include seismic receivers located an azimuth period (i.e., $X \in \{\pi, 2\pi, 180°, 360°\}$) away from the interpolation location depending on whether reciprocity is assumed.

The system computer may then select a bandwidth for the interpolation operator to estimate the data at the interpolation location. The system computer may then form a matrix of interpolation coefficients based on the following function:

$$\frac{1}{2K}\sum_{-m}^{m} e^{ik_n x}\Delta k = \frac{\pi}{KX}\frac{\sin(Kx)}{\sin(\pi x/X)}$$

In the above function, K is a maximum wavenumber, i is an imaginary unit, $k_n$ is a wavenumber being interpolated, $\Delta k=2\pi/X$, m defines K, X is the known period and x is the distance between the seismic receivers in the vicinity of the interpolation location.

The system computer may then form a differences vector based on the above function such that K is a maximum wavenumber, i is an imaginary unit, $k_n$ is a wavenumber being interpolated, $\Delta k=2\pi/X$, m defines K, X is the known period and x is the distance between the seismic receivers in the vicinity of the interpolation location and the interpolation location.

The system computer may then apply the inverse of the matrix of interpolation coefficients to the differences vector to form an interpolation operator vector. The system computer may estimate the seismic data at the interpolation location using the interpolation operator vector. Although the above method for estimating data using an interpolation operator has been described as being used for seismic data, it should be noted that any data type that can be represented by basis functions may be estimated using the above described method. For example, the above method may be used to estimate data related to astronomy and image processing.

One or more implementations of various techniques for estimating data using actual data having a known period in a proximity or vicinity of an interpolation location will now be described in more detail with reference to FIGS. 1-7 and in the following paragraphs.

FIG. 1 illustrates a spatial sampling regime in accordance with implementations of various techniques described herein. The smaller stars within the area 100 illustrate locations L where data may have been acquired. The data may include seismic data received from seismic sensors or the like. In contrast, the larger diamonds illustrate locations where data values are desired. These locations where the larger diamonds are located may be known herein as interpolation locations IL, since various implementations described herein may interpolate or estimate data values at these locations.

The spatial sampling regime 100 is presented on a polar coordinate system such that each small star and large diamond may be defined according to a radius r and an angle θ. Although the spatial sampling regime is described herein on a polar coordinate system, it should be noted that the spatial sampling regime could be provided on any type of coordinate system.

As illustrated in FIG. 1, the locations where the data was obtained are irregularly spaced. Consequently, using the data from the irregularly spaced locations where the seismic data was obtained to perform data processing may yield distorted results. Using regularly and evenly spaced seismic data, e.g., the data values at locations illustrated by the larger diamonds, to perform data processing may yield better results (i.e., less distorted results) than using the irregularly spaced data. Therefore, it may be desirable to estimate or interpolate data values at the interpolation locations using the previously acquired and irregularly data.

Figure 2:
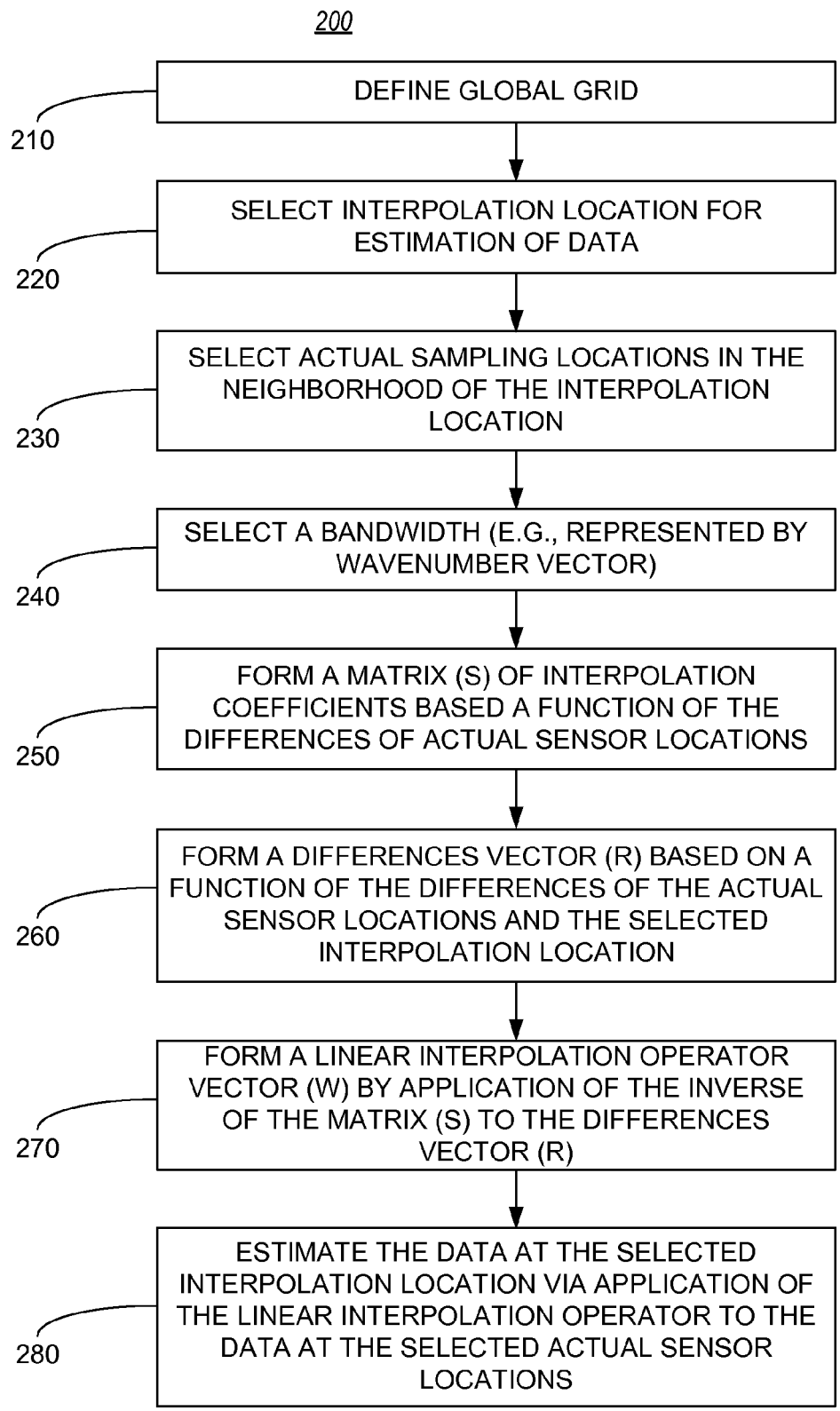
FIG. 2 illustrates a flow diagram of a method for estimating seismic data at desired locations using data acquired at locations different from the desired locations in accordance with implementations of various techniques described herein.

FIG. 2 illustrates a flow diagram of a method 200 for estimating data using actual data having a known period in a proximity or vicinity of an interpolation location. Method 200 may estimate the data values at the interpolation location or the desired location through the use of a weighted average of actual data in a neighborhood or vicinity of the desired location. In one implementation, method 200 may use bandwidth optimized local interpolation operators to interpolate data at the desired interpolation locations. Method 200 may calculate an optimal interpolation operator using interpolation variables that have a known period, thereby providing additional actual data in estimating the data values at the desired locations.

Figure 7:
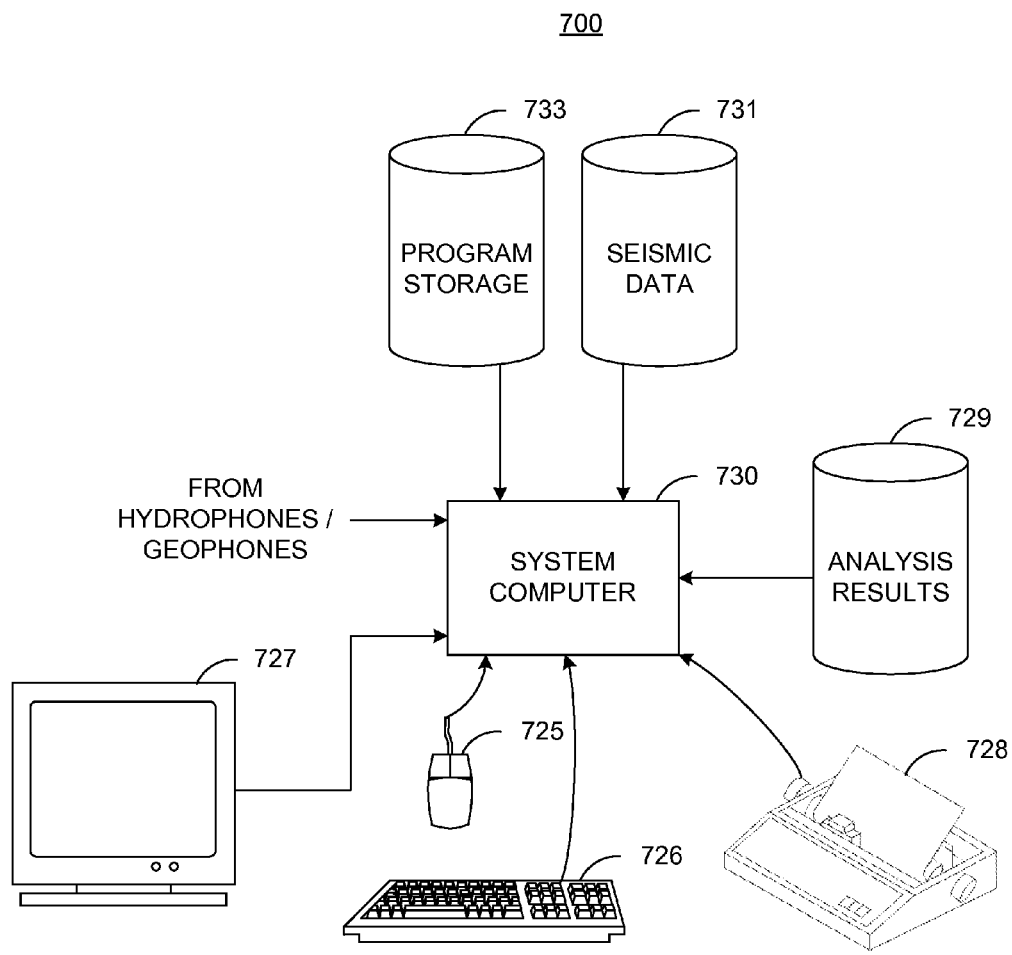
FIG. 7 illustrates a computer network into which implementations of various technologies described herein may be implemented.

Method 200 may be executed by a system computer described in FIG. 7. In one implementation, method 200 may begin at step 210 after data (e.g., seismic data) has been acquired (e.g., from a land or marine based seismic data acquisition system). At step 210, the system computer may define a global grid. The global grid may be defined such that the nodes of the grid are at locations where data values are desired. That is, the nodes of the global grid may correspond to the interpolation locations. The grid may be any type of grid corresponding to the desired interpolation locations, such as, a Cartesian grid, a rectilinear grid, polar coordinate grid, etc. For example, the system computer may define a global grid similar to the grid formed by the large diamonds illustrated in FIG. 1. Also, the grid may be defined such that all of the irregularly spaced data resides within the global grid. The global grid illustrated in FIG. 1 is two-dimensional. However, implementations described herein may be used to estimate or interpolate data in smaller or larger dimensions (e.g., 1D, 3D, etc.) and thus, the global grid may have smaller or larger dimensions. In one implementation, the global grid may not be defined at step 210. Instead, the system computer may execute method 200 starting at step 220 because the global grid does not need to be defined in order to estimate the data values at the desired locations.

At step 220, the system computer may identify or select one or more locations where data values may need to be estimated/interpolated (e.g., interpolation locations). These locations may be the nodes on the global grid where actual seismic data was not acquired. The selected interpolation locations may make up a vector $\vec{y}_j$ (j=1, ..., N) in a space of dimension $N_g$ for estimation of data $\hat{d}(\vec{y}_j)$ from data $\hat{d}(\vec{x}_j)$ at the actual sampling locations $\vec{x}_j$, j=1, ..., M, $\vec{x}_j \in \Re^{N_g}$.

At step 230, the system computer may select a number of actual sampling locations in a proximity or in the vicinity of an interpolation location $\vec{y}_j$. The system computer may select $M_j = M_j(\vec{y}_j)$ actual sampling locations $\vec{x}_i = \vec{x}_j$, i=1, ..., M, $\vec{x}_i \in \Re^{N_g}$ in the vicinity of the interpolation location $\vec{y}_j$. In one implementation, the vicinity of the interpolation location $\vec{y}_j$ may be defined to include an area around the interpolation location such that the area is defined to include all of the actual sampling locations within a predetermined distance from the interpolation location. The area around the interpolation location may form a circle, sphere, rectangle, square, cube, or any other two-dimensional or three-dimensional shape.

For instance, in order to determine whether the actual sampling locations L1, L2 and L3 of FIG. 1 are within the vicinity V of the interpolation location IL1, the system computer may compute a difference between each actual sampling location L and the interpolation location IL1. The difference between each actual sampling location L and the interpolation location IL1 may determine the distance between each actual sampling location L and the interpolation location IL. After calculating the distances between each actual sampling location L and the interpolation location IL, the system computer may determine whether the distances are within a predetermined distance or vicinity V of the interpolation location IL1. If a distance is within the vicinity V of the interpolation location IL1, the system computer may determine that the actual sampling location L that corresponds to the distance is within the vicinity of the interpolation location IL1. For example, in FIG. 1, since the distance between the actual sampling location L1 and the interpolation location IL1 is within the vicinity V, the system computer may select the actual sampling location L1 as part of the vicinity of the interpolation location IL1.

In one implementation, the system computer may identify additional actual sampling locations L as part of the vicinity. Additional actual sampling locations L may include the actual sampling locations L that are located within the vicinity V of the interpolation location IL1 after subtracting one or more azimuth periods from actual sampling locations L. Azimuth periods may be described as polar angle distances where seismic data may be described as having reciprocity. For example, for seismic data, it is assumed that there is reciprocity, i.e., the same seismic data may be obtained if the source and receiver locations of a source-receiver pair are swapped. Swapping the source-receiver pair may result in changing the azimuth by 180 degrees. As such, the azimuth period is defined as 180 degrees. Similarly, azimuth periods may be defined as a multiple of 360 degrees because azimuths that differ by multiples of 360 degrees refer to the same location. For instance, the system computer may subtract a multiple of the azimuth period from each actual sampling location L. Using the actual sampling locations L of FIG. 1 as an example, the system computer may subtract the known azimuth period from the actual sampling locations L2 and L3. In FIG. 1, the known azimuth period may be 180 degrees. As such, the system computer may subtract 180 degrees from each actual sampling location L2 and L3 to create modified actual sampling locations. The modified actual sampling locations L2 and L3 will be located in the first quadrant (i.e., between 0 degrees and 90 degrees) of the polar coordinate system because the original actual sampling locations L2 and L3 are located in the third quadrant which is 180 degrees from the first quadrant. After creating the modified actual sampling locations, the system computer may then determine the distance between the interpolation location IL1 and each modified actual sampling location. The system computer may then determine whether the modified actual sampling locations are located within the predetermined distance or the vicinity V of the interpolation location IL1. If the modified actual sampling locations are located within the vicinity V of the interpolation location IL1, the system computer may consider the corresponding actual sampling locations (i.e., L2 and L3) as part of the actual sampling locations in the vicinity V of the interpolation location IL1 selected at step 230. Although in this implementation the known period has been described as 180 degrees, it should be noted that in other implementations the known period may be any multiple of 180 degrees such that the multiple may be any integer. Although the above implementation describes the azimuth as a periodic variable, it should be noted that in other implementations, the periodic variable may be any data that may have periodic characteristics. In this implementation, the period may be defined to be the smallest X such that d(x)=d(x+X), and the period may depend on the data type. For example, in astronomy, the period may be the time it takes for a planet to rotate around its axis or to orbit around a star.

At step 240, the system computer may select a bandwidth. The bandwidth may be selected by selecting a wave number vector $\vec{k}=\vec{k}_{max}$ in $\Re^{Ng}$. The wave number vector may be selected based on the nominal grid size, $k_i=1/(2*dx_i)$, for each component of the wave number vector. Next, at step 250 a $M_j \times M_j$ ($M_j$ by $M_j$) sized matrix $S=S(\vec{k})$ may be formed based on a function of the differences between the selected actual sampling locations such that the function includes one or more periodic interpolation variables, e.g., see Equation 1 below.

$$\frac{1}{2K}\sum_{-m}^{m} e^{ik_n x}\Delta k = \frac{\pi}{KX}\frac{\sin(Kx)}{\sin(\pi x/X)} \quad \text{Equation 1}$$

In equation 1, K is a wavenumber that corresponds to the bandwidth received at step 240, i is an imaginary unit, $k_n$ is a wavenumber being interpolated, $\Delta k=2\pi/X$, m defines K, X is a known period and x is the distance between the selected actual sampling locations. For those functions that do not have periodic interpolation variables, sinc functions may be used to form a $M_j \times M_j$ ($M_j$ by $M_j$) sized matrix $S=S(\vec{k})$.

Then, at step 260, the system computer may form an sized differences vector $\vec{r}=\vec{r}(\vec{k})$ based on a function of the differences between the selected actual sampling locations and the selected interpolation location. The system computer may use the equation provided in Equation 1 to form the $M_j$ sized vector. However, the variables of Equation 1 are defined such that K is a wavenumber that corresponds to the bandwidth received at step 240, i is an imaginary unit, $k_n$ is a wavenumber being interpolated, $\Delta k=2\pi/X$, m defines K, X is a known period and x is the distance between the selected actual sampling locations and the interpolation location.

Next, at step 270, the system computer may form a $M_j$ sized linear interpolation operator vector $\vec{w}=\vec{w}(\vec{k})$ by applying the inverse of the matrix S to the differences vector $\vec{r}$ (i.e., $\vec{w}=\vec{w}(\vec{k})=S^{-1}\vec{r}$).

At step 280, the system computer may estimate or interpolate the data value at the interpolation location by applying the linear interpolation operator ($\vec{w}$) to the data at the selected actual sampling locations in the vicinity of the interpolation location.

After estimating the data value at the interpolation location, the system computer may repeat the process described in method 200 for another interpolation location. According to implementations described herein, the system computer may store the interpolated data for later use, present the interpolated data visually to a user (e.g., via a monitor, printout, etc), or use the interpolated data for further data processing.

Prior Information

In one implementation, if prior information is available related to the relative wavenumber content of the data being interpolated, or to the relative importance of each wavenumber, the system computer may generalize Equation 1 to:

$$\frac{1}{2K}\sum_{-m}^{m} w_n e^{ik_n x}\Delta k$$

wherein $w_n$ is a weight which defines the relative importance of wavenumber $k_n$. If all wavenumbers are considered equally important, such that $w_n$ is constant, then the series reduces to the previous form.

In general, however, there is no closed form for this series, though it is clearly related to the inverse discrete Fourier transform of the prior. This generalization is analogous to the use of prior information to improve the performance of Yen-4 interpolators in the non-periodic case. In this case, the sinc functions are replaced by the inverse continuous Fourier transforms of the prior.

In one implementation, periodic dimensions may be evaluated for periodic functions in addition to sinc functions which may be evaluated for the non-periodic points on the function. The periodic functions involve substituting the existing sinc functions with the ratio of sine functions given above, and altering the selection of local traces (for each output trace) to include traces that are approximately a multiple of the period from the output trace.

Figure 3:
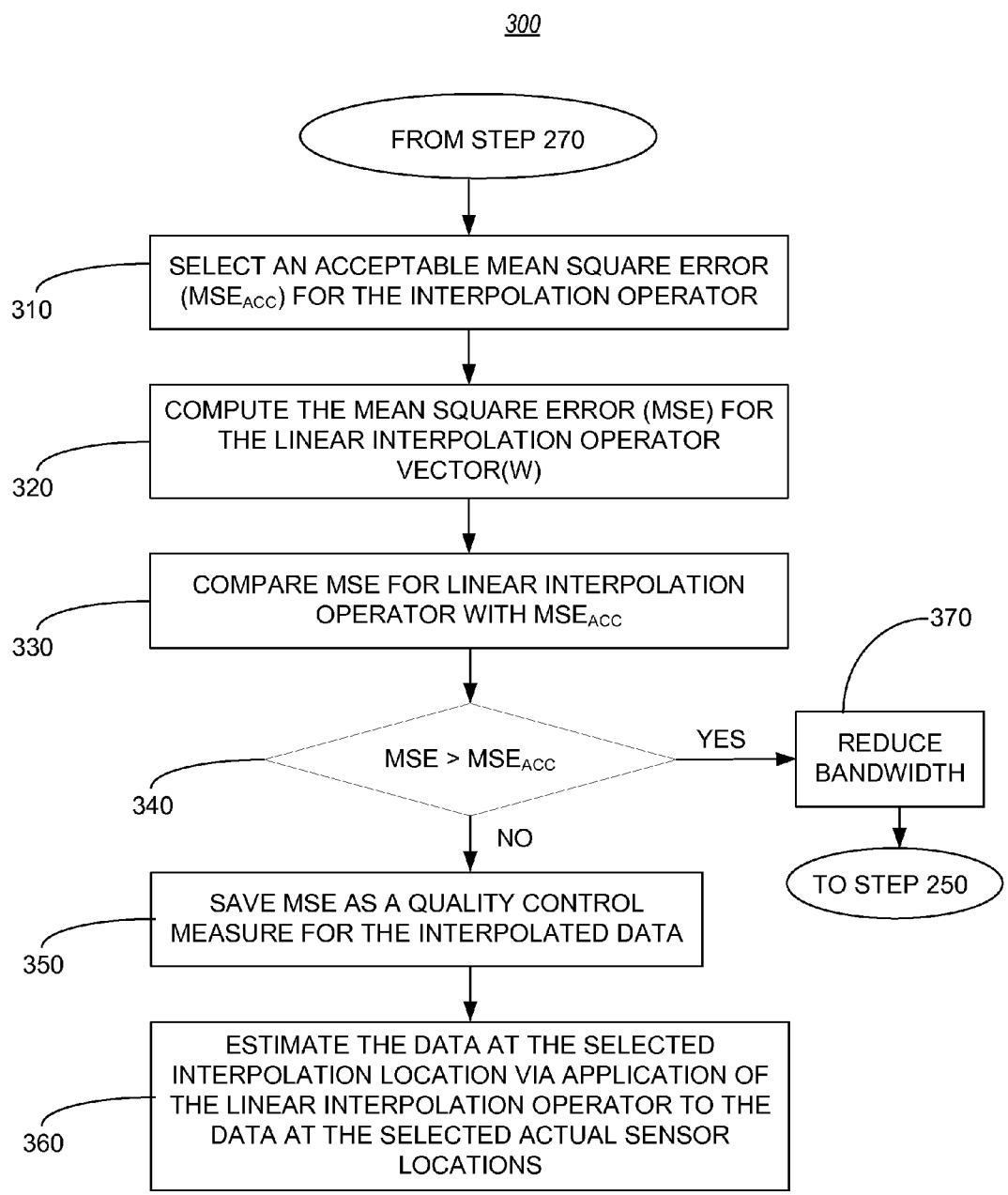
FIG. 3 illustrates a flow diagram of a method for increasing the accuracy in estimating seismic data at an interpolation location according to one or more implementations of various techniques described herein.

FIG. 3 illustrates a flow diagram of a method for increasing the accuracy in estimating seismic data at an interpolation location according to one or more implementations of various techniques described herein. The following description of the flow diagram in method 300 is made with reference to the flow diagram in method 200 of FIG. 2. In one implementation, method 300 may be used to provide conditions such that the seismic data at the interpolation location may be iteratively estimated until the linear interpolation operator W formed at step 270 has a mean square error value below an acceptable mean square value. In one implementation, the system computer may start method 300 after performing step 270 of the method 200 in FIG. 2.

At step 310, the system computer may select an acceptable mean square error ($MSE_{ACC}$) for the interpolation operator. In one implementation, the interpolation operator may be calculated earlier in step 270 of method 200. The acceptable mean square error may, for example, be a user specified threshold which may be used later for comparison with a mean square error for the calculated interpolation operator. Then, at step 320, the system computer may calculate a mean square error (MSE) for the linear interpolation operator vector ($\vec{w}$).

After calculating the MSE for the interpolation operator vector, at step 330, the system computer may compare the acceptable mean square error selected in step 310 with the mean square error for the interpolation operator calculated in step 320. At step 340, the system computer may determine if the mean square error for the interpolation operator is greater than the acceptable mean square error.

If during step 340 the system computer determines that the mean square error for the interpolation operator is greater than the acceptable mean square error, the system computer may proceed to step 370 to reduce the spatial bandwidth. The system computer may reduce the spatial bandwidth by reducing the value of the wave number. Then the system computer may repeat steps 250-270 to determine a new or a second interpolation operator using the reduced spatial bandwidth. Then the system computer may repeat step 310-320 to determine a mean square error for the new interpolation operator. The system computer may then compare the new mean square error for the new interpolation operator with the acceptable mean square error during steps 330-340. If the new mean square error is not less than or equal to the acceptable mean square error, the system computer may return to step 370 to again reduce the spatial bandwidth.

If the mean square error for the interpolation operator is less than or equal to the acceptable mean square error, the system computer may proceed to step 350 to save the interpolation operator mean square error as a quality control measure for interpolated data. Then at step 360, the system computer may estimate or interpolate the data value at the interpolation location by applying the linear interpolation operator ($\vec{w}$) to the data at the selected actual sampling locations in the vicinity of the interpolation location.

After estimating the data value at the interpolation location, the system computer may repeat the methods described in FIGS. 2-3 for another interpolation location. After the system computer has estimated a data value for all of the interpolation locations, the process described in method 300 may end.

Consequently, the system computer may continue to reduce the spatial bandwidth (by reducing the wave number in step 370) until an interpolation operator is computed with the reduced bandwidth having a mean square error less than or equal to the acceptable mean square error. The system computer may determine an optimal interpolation operator having a specific spatial bandwidth (i.e., wave number) and having an acceptable mean square error for each interpolation location.

As previously mentioned, the system computer may store the interpolated data for later use, present the interpolated data visually to a user (e.g., via a monitor, printout, etc), or use the interpolated data for further data processing.

Figure 4:
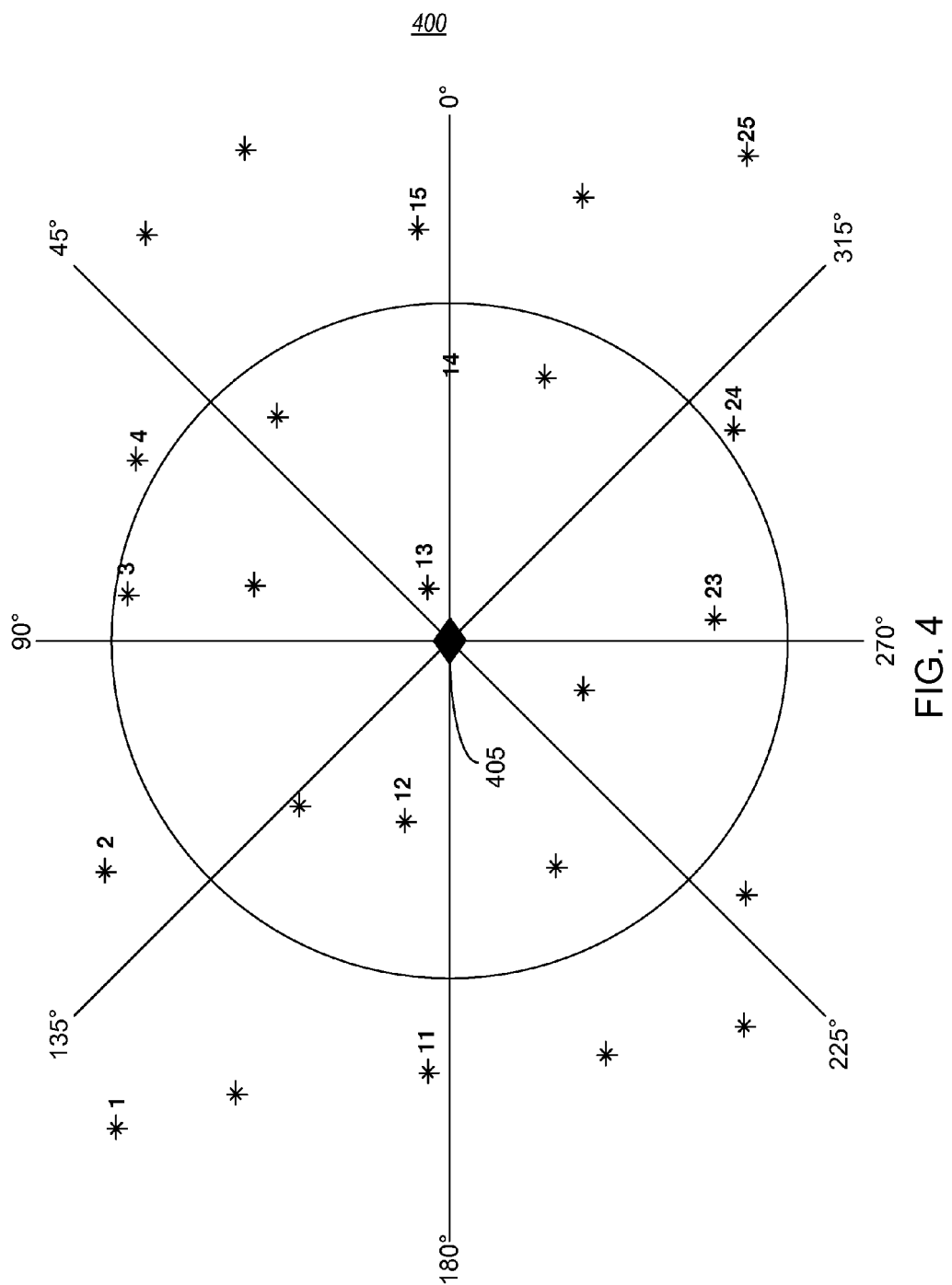

FIG. 4 illustrates exemplary data (e.g., seismic data) acquired at irregular sampling locations within an area 400. FIG. 4 also illustrates a location where data is desired. The actual sampling locations are indicated as stars, and the desired interpolation location 405 is indicated by the diamond. Twenty-five actual sampling locations are illustrated in FIG. 4, with the first sampling location occurring in the upper left hand corner and the twenty-fifth sampling location occurring in the lower right hand corner. An ordering number is illustrated in FIG. 4 alongside some of the actual sampling locations (e.g., 1, 2, 3, 4, etc.). Any ordering of the actual sampling locations would be acceptable for purposes of the implementation.

Figure 5:
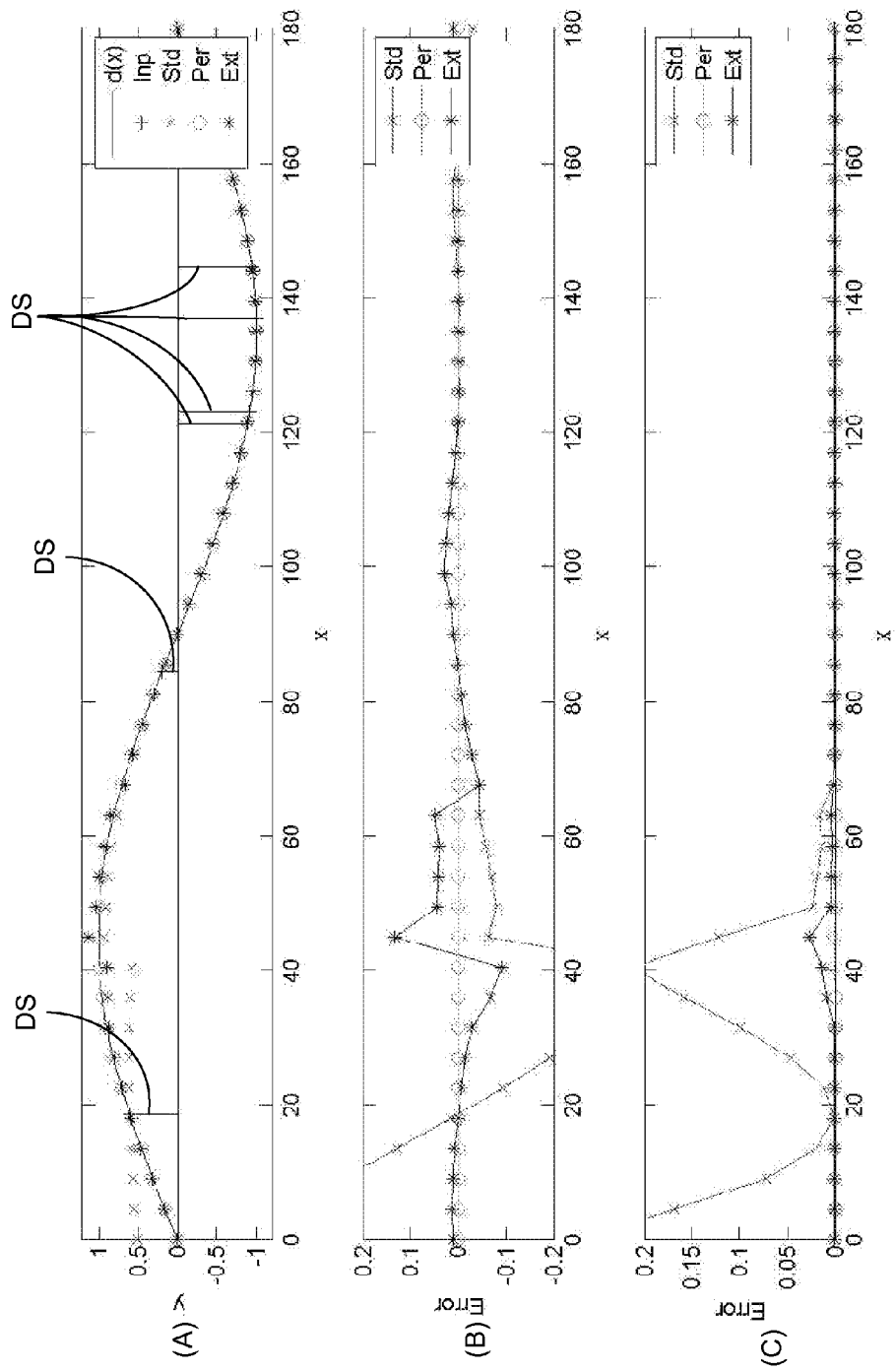
FIGS. 5 and 6 illustrate a comparison of interpolation methods for the interpolation of a sparsely-sampled function that is known to be periodic according to one or more implementations of various techniques described herein.

According to certain aspects of the implementation, an acceptable mean square error may be selected and spatial bandwidth optimization may be applied (e.g., maximum wave number or local grid) to calculate an optimal interpolation operator. FIG. 5 illustrates advantages in using functions that are known to be periodic, with a known period. FIG. 5 compares standard, periodic and extrapolated interpolation methods for interpolation of a sparsely-sampled function that is known to be periodic.

In FIG. 5, the known period, X is 180° and there are 7 input data samples DS, such that the average spacing between samples $\Delta x$ is about 25°. The locations of the input samples are indicated in plot A by the black crosses and the vertical bars (one of which is underneath the legend). Plot A also shows a test function (line curve) which corresponds to the lowest non-zero wavenumber with the required periodicity (the fundamental mode).

Three interpolation techniques are compared in FIG. 5. The three interpolation techniques include a standard technique ("Std"), a periodic technique ("Per") and an extrapolated technique ("Ext"). The standard technique Std does not use the information about the periodicity of the input data, and hence solves a standard system of linear equations containing sinc functions. The periodic technique Per uses the periodic formulation described in method 200 of FIG. 2. The extrapolated technique Ext is the same as the standard technique Std, except that the input data are extrapolated before they are interpolated. The extrapolated technique Ext extends the range of the input data from the interval [0°, 180°] to the interval [−L, 180°+L] by creating copies of each input trace at locations x+rX, where x is the original location, X is the known period and r is an integer. This extrapolation helps avoid edge effects. For this example, the operator half-length, L, was $3\Delta x$, i.e., about 75°. Extrapolation therefore creates input data in the intervals [−75°, 0°] and [180°, 255°] from input data in the intervals [105°, 180°] and [0°, 75°], respectively.

Plot A shows the interpolated data using the three methods (see the legend) at output locations regularly spaced over the interval [0°, 180°]. Plot B shows the error in the interpolated data. All three methods used the same maximum wavenumber K. As shown in plot B, the periodic technique Per outperforms both the standard technique Std and the extrapolation technique Ext. Plot B also indicates that the extrapolation technique Ext outperforms the standard technique Std. Both the extrapolation technique Ext and the standard technique Std have large errors in the largest gap. The standard technique Std also has large errors at the edges of the interval due to edge effects.

The accuracy of the standard technique Std improves at about 45°. This improvement occurs because the operator is long enough to include the input data sample DS at 122°, as well as those at 18° and 84°. For lower output locations, the input data sample DS at 122° is beyond the length of the operator. As such, the extrapolation technique Ext does not exhibit the same improvement as seen with the standard technique Std. Although the extrapolation technique Ext sees the input data sample DS at 122°, the extrapolation technique Ext loses the information from the extrapolated data in the interval [−75°, 0°].

Plot C shows the theoretical interpolation error averaged over all basis functions for which the operator was designed. This is the error measure that is minimized in designing the operator. Plot C also demonstrates the superiority of the periodic technique Per over the extrapolation technique Ext and the standard technique Std. Plot C also illustrates the benefits of the extrapolation technique Ext over the standard technique Std created by extrapolating the input data samples DS.

Figure 6:
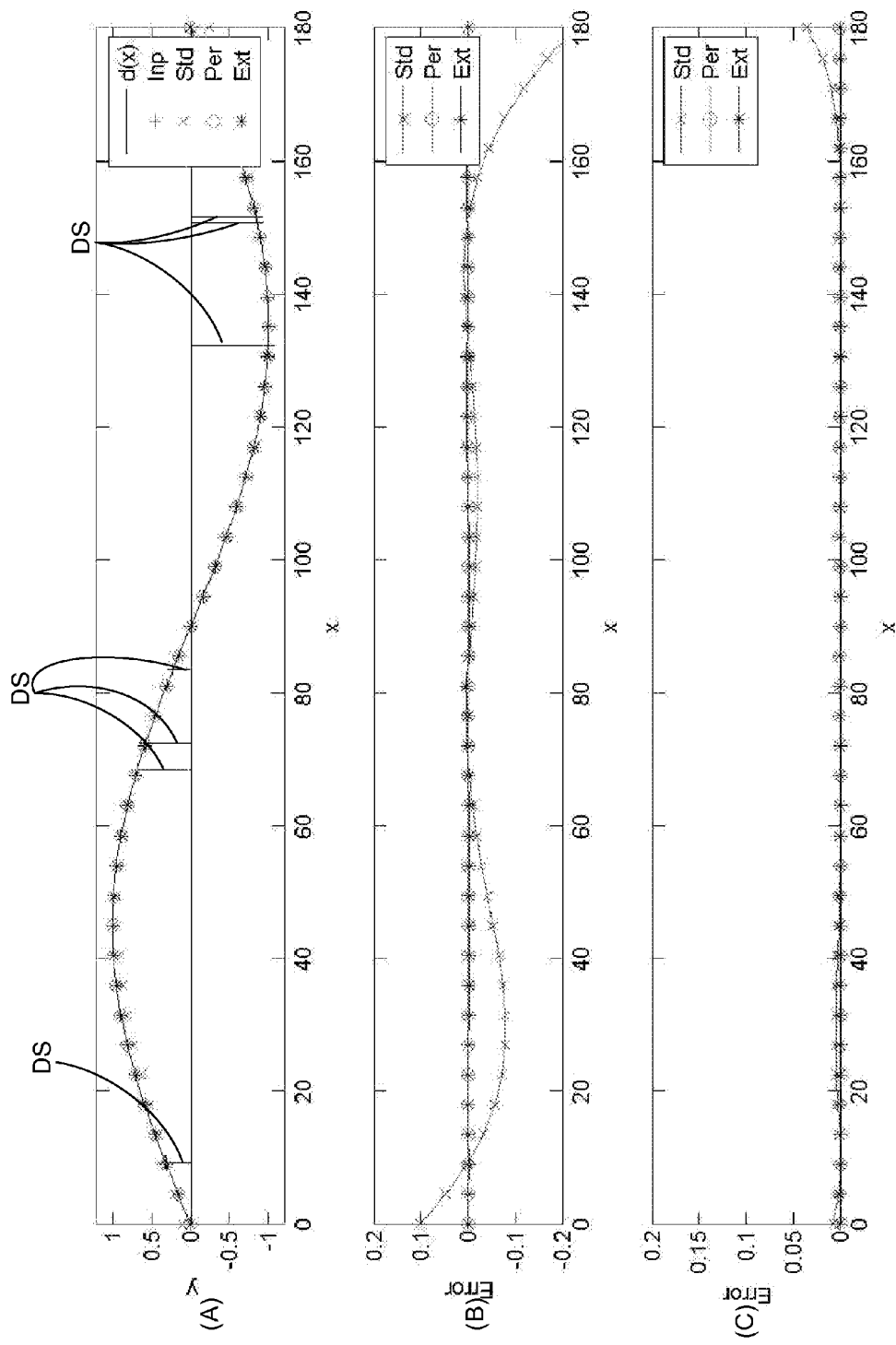

FIG. 6 illustrates the results of a test identical to that shown in FIG. 5, except that the operator half-length, L, has been increased from 3Δx to 7Δx. As a consequence, more input data samples DS are available for the interpolation operator design, though the locations of additional data points are all further from the output location than were the original locations. The periodic technique Per results remain near-perfect, and are now matched in quality by the extrapolation technique Ext results. The standard technique Std results, however, still show significant errors, especially near the edges of the interval. The improvement in the extrapolation technique Ext results, however, comes at a significant cost, because the data may now need to be extrapolated by about 175° at either end of the range. This means that the input data volume is almost tripled, and the number of traces used to design the operators is significantly higher than for the periodic technique Per and the standard technique Std. This extrapolation may be avoided if periodic basis functions are used to design the operators.

FIG. 7 illustrates a computing system 700, into which implementations of various techniques described herein may be implemented. The computing system 700 (system computer) may include one or more system computers 730, which may be implemented as any conventional personal computer or server. However, those skilled in the art will appreciate that implementations of various techniques described herein may be practiced in other computer system configurations, including hypertext transfer protocol (HTTP) servers, hand-held devices, multiprocessor systems, microprocessor-based or programmable consumer electronics, network PCs, minicomputers, mainframe computers, and the like.

The system computer 730 may be in communication with disk storage devices 729, 731, and 733, which may be external hard disk storage devices. It is contemplated that disk storage devices 729, 731, and 733 are conventional hard disk drives, and as such, will be implemented by way of a local area network or by remote access. Of course, while disk storage devices 729, 731, and 733 are illustrated as separate devices, a single disk storage device may be used to store any and all of the program instructions, measurement data, and results as desired.

In one implementation, seismic data from the receivers may be stored in disk storage device 731. The system computer 730 may retrieve the appropriate data from the disk storage device 731 to process seismic data according to program instructions that correspond to implementations of various techniques described herein. The program instructions may be written in a computer programming language, such as C++, Java and the like. The program instructions may be stored in a computer-readable medium, such as program disk storage device 733. Such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the system computer 730. Communication media may embody computer readable instructions, data structures or other program modules. By way of example, and not limitation, communication media may include wired media such as a wired network or direct-wired connection, and wireless media such as acoustic, RF, infrared and other wireless media. Combinations of any of the above may also be included within the scope of computer readable media.

In one implementation, the system computer 730 may present output primarily onto graphics display 727, or alternatively via printer 728. The system computer 730 may store the results of the methods described above on disk storage 1029, for later use and further analysis. The keyboard 726 and the pointing device (e.g., a mouse, trackball, or the like) 725 may be provided with the system computer 730 to enable interactive operation.

The system computer 730 may be located at a data center remote from the survey region. The system computer 730 may be in communication with the receivers (either directly or via a recording unit, not shown), to receive signals indicative of the reflected seismic energy. These signals, after conventional formatting and other initial processing, may be stored by the system computer 730 as digital data in the disk storage 731 for subsequent retrieval and processing in the manner described above. In one implementation, these signals and data may be sent to the system computer 730 directly from sensors, such as geophones, hydrophones and the like. When receiving data directly from the sensors, the system computer 730 may be described as part of an in-field data processing system. In another implementation, the system computer 730 may process seismic data already stored in the disk storage 731. When processing data stored in the disk storage 731, the system computer 730 may be described as part of a remote data processing center, separate from data acquisition. The system computer 730 may be configured to process data as part of the in-field data processing system, the remote data processing system or a combination thereof. While FIG. 7 illustrates the disk storage 731 as directly connected to the system computer 730, it is also contemplated that the disk storage device 731 may be accessible through a local area network or by remote access. Furthermore, while disk storage devices 729, 731 are illustrated as separate devices for storing input seismic data and analysis results, the disk storage devices 729, 731 may be implemented within a single disk drive (either together with or separately from program disk storage device 733), or in any other conventional manner as will be fully understood by one of skill in the art having reference to this specification.

While the foregoing is directed to implementations of various techniques described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for interpolating seismic data, comprising:
   receiving data acquired at one or more locations, wherein the data represents subterranean formations in the earth;
   selecting one or more of the locations, wherein the selected locations are within a vicinity of an interpolation location;
   forming a matrix of interpolation coefficients, using a processor, based on a first function having one or more interpolation variables, a bandwidth for an interpolation operator and one or more differences between the selected locations, wherein at least one of the interpolation variables is periodic;

forming a differences vector based on a second function having the interpolation variables, the bandwidth and one or more differences between the selected locations and the interpolation location;

forming an interpolation operator vector by applying an inverse of the matrix of interpolation coefficients to the differences vector; and estimating a data value for the interpolation location using the interpolation operator vector.

2. The method of claim 1, further comprising receiving the bandwidth for the interpolation operator before forming the matrix of interpolation coefficients.

3. The method of claim 1, further comprising:
computing a mean square error for the interpolation operator vector;
comparing the mean square error for the interpolation operator vector with a predetermined acceptable mean square error; and
if the mean square error for the interpolation operator vector is less than or equal to the predetermined acceptable mean square error, estimating the data value for the interpolation location using the interpolation operator vector.

4. The method of claim 3, further comprising:
if the mean square error for the interpolation operator vector is greater than the predetermined acceptable mean square error, reducing the bandwidth for the interpolation operator;
forming a second matrix of interpolation coefficients based on a third function having the interpolation variables, the reduced bandwidth and the differences between the selected locations;
forming a second differences vector based on a fourth function having the interpolation variables, the reduced bandwidth and the differences between the selected locations and the interpolation location;
forming a second interpolation operator vector by applying an inverse of the second matrix of interpolation coefficients to the second differences vector; and
estimating the data value for the interpolation location using the second interpolation operator vector.

5. The method of claim 3, further comprising saving the mean square error for the interpolation operator vector as a quality control measure.

6. The method of claim 1, wherein selecting the locations comprises:
computing a difference between each of the locations and the interpolation location;
identifying one or more differences lower than a predetermined value; and
selecting a portion of the locations based on the identified differences.

7. The method of claim 1, wherein selecting the locations comprises:
subtracting a multiple of a period from each of the locations to create one or more modified locations;
computing a difference between each of the modified locations and the interpolation location;
identifying one or more differences lower than a predetermined value; and
selecting a portion of the locations based on the identified differences.

8. The method of claim 7, wherein the period is 180 degrees or 360 degrees.

9. The method of claim 7, wherein the multiple is an integer.

10. The method of claim 1, wherein the vicinity comprises an area within a predetermined distance from the interpolation location.

11. The method of claim 1, wherein the interpolation variables represent time, azimuth or temperature.

12. The method of claim 1, wherein the first function is defined by:

$$\frac{1}{2K}\sum_{-m}^{m} e^{ik_n x}\Delta k = \frac{\pi}{KX}\frac{\sin(Kx)}{\sin(\pi x/X)}$$

wherein K is a maximum wavenumber, i is an imaginary unit, $h_n$ is a wavenumber being interpolated, $$k_n = \frac{2\pi n}{X} = n\Delta k,$$

$\Delta k=2\pi/X$, m defines K, $K=(m+\frac{1}{2})\Delta k$, X is a known period of the interpolation variables and x is the differences between the selected locations.

13. The method of claim 1, wherein the second function is defined by:

$$\frac{1}{2K}\sum_{-m}^{m} e^{ik_n x}\Delta k = \frac{\pi}{KX}\frac{\sin(Kx)}{\sin(\pi x/X)}$$

wherein K is a maximum wavenumber, i is an imaginary unit, $k_n$ is a wavenumber being interpolated, $$k_n = \frac{2\pi n}{X} = n\Delta k,$$

$\Delta k=2\pi/X$, m defines K, $K=(m+\frac{1}{2})\Delta k$, X is a known period of the interpolation variables and x is the differences between the selected locations and the interpolation location.

14. The method of claim 4, wherein the third function is defined by:

$$\frac{1}{2K}\sum_{-m}^{m} e^{ik_n x}\Delta k = \frac{\pi}{KX}\frac{\sin(Kx)}{\sin(\pi x/X)}$$

wherein K is a reduced wavenumber, i is an imaginary unit, $k_n$ is a wavenumber being interpolated, $$k_n = \frac{2\pi n}{X} = n\Delta k,$$

$\Delta k=2\pi/X$, m defines K, $K=(m+\frac{1}{2})\Delta k$, X is a known period of the interpolation variables and x is the differences between the selected locations.

15. The method of claim 4, wherein the fourth function is defined by:

$$\frac{1}{2K}\sum_{-m}^{m}e^{ik_nx}\Delta k = \frac{\pi}{KX}\frac{\sin(Kx)}{\sin(\pi x/X)}$$

wherein K is a reduced wavenumber, i is an imaginary unit, $k_n$ is a wavenumber being interpolated, $$k_n = \frac{2\pi n}{X} = n\Delta k,$$

$\Delta k = 2\pi/X$, m defines K, $K=(m+\frac{1}{2})\Delta k$, X is a known period of the interpolation variables and x is the differences between the selected locations and the interpolation location.

16. The method of claim 1, further comprising defining the first function as:

$$\frac{1}{2K}\sum_{-m}^{m}w_n e^{ik_nx}\Delta k$$

wherein K is a maximum wavenumber, i is an imaginary unit, $k_n$ is the wavenumber being interpolated, $$k_n = \frac{2\pi n}{X} = n\Delta k,$$

$\Delta k = 2\pi/X$, m defines K, $K=(m+\frac{1}{2})\Delta k$, $w_n$ is a weight which defines a relative importance of the wavenumber $k_n$ and x is the distance between the selected locations.

17. A method for interpolating seismic data, comprising:
   receiving seismic data acquired at one or more locations, wherein the seismic data represents subterranean formations in the earth;
   selecting one or more of the locations, wherein the selected locations are within a vicinity of an interpolation location;
   selecting a bandwidth for an interpolation operator;
   forming a matrix of interpolation coefficients, using a processor, based on a first function having one or more interpolation variables, the bandwidth and one or more differences between the selected locations, wherein at least one of the interpolation variables is periodic;
   forming a differences vector based on a second function having the interpolation variables, the bandwidth and one or more differences between the selected locations and the interpolation location;
   forming an interpolation operator vector by application of the inverse of the matrix of interpolation coefficients to the differences vector;
   computing a mean square error for the interpolation operator vector;
   comparing the mean square error for the interpolation operator vector with a predetermined acceptable mean square error; and
   if the mean square error for the interpolation operator vector is less than or equal to the predetermined acceptable mean square error, estimating a seismic data value for the interpolation location using the interpolation operator vector.

18. The method of claim 17, further comprising:
   if the mean square error for the interpolation operator vector is greater than the predetermined acceptable mean square error, reducing the bandwidth for the interpolation operator;
   forming a second matrix of interpolation coefficients based on a third function having the interpolation variables, the reduced bandwidth and the differences between the selected locations;
   forming a second differences vector based on a fourth function having the interpolation variables, the reduced bandwidth and the differences between the selected locations and the interpolation location;
   forming a second interpolation operator vector by applying an inverse of the second matrix of interpolation coefficients to the second differences vector; and
   estimating the seismic data value for the interpolation location using the second interpolation operator vector.

19. A computer system, comprising:
   a processor; and
   a memory comprising program instructions executable by the processor to:
      receive data acquired at one or more locations, wherein the data represents subterranean formations in the earth;
      select one or more of the locations, wherein the selected locations are within a vicinity of an interpolation location;
      select a bandwidth for an interpolation operator;
      form a matrix of interpolation coefficients based on a first function having on one or more interpolation variables, the bandwidth and one or more differences between the selected locations, wherein at least one of the interpolation variables is periodic;
      form a differences vector based on a second function having the interpolation variables, the bandwidth and one or more differences between the selected locations and the interpolation location;
      form an interpolation operator vector by applying an inverse of the matrix of interpolation coefficients to the differences vector; and
      estimate a data value for the interpolation location using the interpolation operator vector.

20. The computer system of claim 19, wherein the program instructions executable by the processor to select the locations comprises program instructions executable by the processor to:
   subtract a multiple of a period from each of the locations to create one or more modified locations;
   compute a difference between each of the modified locations and the interpolation location;
   identify one or more differences lower than a predetermined value; and
   select a portion of the locations based on the identified differences.

* * * * *